(12) United States Patent
Chang

(10) Patent No.: US 7,787,052 B2
(45) Date of Patent: Aug. 31, 2010

(54) BROADCASTING RECEIVER HAVING FREEZE FUNCTION AND A METHOD THEREOF

(75) Inventor: Hye-young Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 11/370,974

(22) Filed: Mar. 9, 2006

(65) Prior Publication Data

US 2006/0215059 A1 Sep. 28, 2006

(30) Foreign Application Priority Data

Mar. 24, 2005 (KR) ............................ 2005-0024561

(51) Int. Cl.
*H04N 5/44* (2006.01)
*H04N 5/50* (2006.01)
*H04N 7/00* (2006.01)
*H04N 11/00* (2006.01)

(52) U.S. Cl. ....................... 348/559; 348/569; 348/468; 348/589

(58) Field of Classification Search ......... 348/553–570, 348/468, 578–601
See application file for complete search history.

(56) References Cited

U.S. PATENT DOCUMENTS 5,959,687 A * 9/1999 Dinwiddie et al. .......... 348/564

7,319,468 B2 * 1/2008 Baker ......................... 345/629
2002/0129365 A1 9/2002 Kim et al.

FOREIGN PATENT DOCUMENTS

| JP | 2001-197386 A | 7/2001 |
|---|---|---|
| KR | 1996-016468 A | 5/1996 |
| KR | 10-2000-0034375 A | 6/2000 |
| KR | 10-2002-0014555 A | 2/2002 |

* cited by examiner

*Primary Examiner*—M. Lee
(74) *Attorney, Agent, or Firm*—Sughrue Mion, PLLC

(57) ABSTRACT

A broadcasting receiver having a freeze function and a method thereof. The broadcasting receiver has an operation reception unit receiving predetermined operation signals; a graphic driver unit continuously outputting one frame of same image signal and/or one frame of same additional data, according to a freezing command input through the operation reception unit; a scaler unit scaling the one frame of same image signal and/or the one frame of same additional data; a display unit displaying the one frame of same image signal and/or the one frame of same additional data as scaled; an on-screen-display (OSD) generation unit producing OSD data corresponding to a predetermined external operation signal input through the operation reception unit; and a control unit controlling the graphic driver unit to blend the OSD data with the one frame of same image signal and/or the one frame of same additional data and output them as blended.

12 Claims, 4 Drawing Sheets

BROADCASTING RECEIVER HAVING FREEZE FUNCTION AND A METHOD THEREOF

CROSS-REFERENCE TO RELATED APPLICATIONS

This application claims benefit under 35 U.S.C. §119(a) of Korean Patent Application No. 2005-24561, filed Mar. 24, 2005, the entire contents of which are incorporated herein by reference.

BACKGROUND OF THE INVENTION

1. Field of the Invention

The present invention relates to a broadcasting receiver having a freeze function and a method thereof. More particularly, the present invention relates to a broadcasting receiver having a freeze function, capable of displaying updated additional information offered by a broadcasting station on a screen by updating an on-screen-display (OSD) menu by a user even in a frozen state of an image, and a method thereof.

2. Description of the Related Art

Generally, a broadcasting receiver, such as a television, processes a broadcasting signal transmitted from a broadcasting station and thereby enables a user to receive various information transmitted by the broadcasting station regardless of the user's age and position. Such a broadcasting receiver is equipped with a freeze function that converts a moving picture to a still image.

FIG. 1 is a block diagram of a conventional broadcasting receiver.

Referring to FIG. 1, the conventional broadcasting receiver comprises a broadcasting signal reception unit 10, an image signal process unit 20, an operation reception unit 30, an on-screen-display (OSD) generation unit 40, a scaler unit 50, a control unit 60 and a display unit 70.

Among broadcasting signals transmitted from a predetermined broadcasting station, the broadcasting signal reception unit 10 receives a broadcasting signal corresponding to a channel selected by control of the control unit 60 which will be descried hereinafter. The image signal process unit 20 processes an image signal included in the broadcasting signals. An audio signal process unit (not shown) processes an audio signal included in the broadcasting signal. The processed audio signal is output through an audio output unit (not shown) such as a speaker.

The operation reception unit 30 is input with external operation for controlling the operation of the broadcasting receiver by a user and transmits the input operation to the control unit 60. The OSD generation unit 40 produces OSD data corresponding to an external operation signal input through the operation reception unit 30. The scaler unit 50 scales the processed image signal and the OSD data. The display unit 70 displays the scaled image signal and the OSD data as an image and an OSD menu on a screen.

The control unit 60 controls the broadcasting signal reception unit 10 to select a broadcasting signal corresponding to the selected channel, and also, controls the image signal process unit 20 to process the image signal included in the broadcasting signal. Furthermore, the control unit 60 controls the scaler unit 50 to scale the OSD data produced by the OSD generation unit 40 and the processed image signal.

When a freezing command is received through the operation reception unit 30, the image and the OSD menu being currently displayed on the screen do not change, and this state is called a frozen state. In other words, the control unit 60 controls the scaler unit 50 to display the image signal and the OSD data corresponding to time of receiving the freezing command. The frozen state is maintained until another predetermined external operation signal is received through the operation reception unit 30. When the user inputs a predetermined external operation signal using a remote controller (not shown) and a key pad (not shown), the frozen state is released and therefore, the broadcasting receiver processes and keeps displaying on the screen the image signal included in the received broadcasting signal and the OSD data produced by the OSD generation unit 40.

Upon receiving the freezing command, the OSD menu as well as the image is displayed in the frozen state. In this state, the user is not able to update contents being displayed by changing the OSD menu through the remote controller (not shown) and the key pad (not shown). Moreover, if a broadcasting receiver for digital broadcasting, which is common nowadays, gets into the frozen state, the image, the additional information, and the OSD menu cannot be separately controlled so that the user may not be able to use the various additional information offered by the broadcasting station.

SUMMARY OF THE INVENTION

An aspect of the present invention is to solve at least the above problems and/or disadvantages and to provide at least the advantages described below. Accordingly, an aspect of the present invention is to provide a broadcasting receiver having a freeze function, capable of displaying updated additional information offered by a broadcasting station on a screen by updating an on-screen-display (OSD) menu according to an external operation signal input by a user even in a frozen state, and a method thereof.

In order to achieve the above-described aspects of the present invention, there is provided a broadcasting receiver comprising an operation reception unit receiving predetermined operation signals; a graphic driver unit continuously outputting at least one between one frame of a same image signal and one frame of a same additional data, according to a freezing command input through the operation reception unit; a scaler unit scaling at least one between the one frame of the same image signal and the one frame of the same additional data; a display unit presenting on a screen at least one between the one frame of the same image signal and the one frame of the same additional data as scaled; an on-screen-display (OSD) generation unit producing OSD data corresponding to a predetermined external operation signal input through the operation reception unit; and a control unit controlling the graphic driver unit to blend the OSD data with at least one between the one frame of the same image signal and the one frame of the same additional data and output them as blended data.

The graphic driver unit comprises an image buffer storing an image signal included in a predetermined broadcasting signal; an image canvas part reading out the one frame of same image signal from the image buffer part, thereby generating an image layer; a data buffer part storing additional data included in the broadcasting signal; a data canvas part, according to an external operation signal for selecting one additional data, reading out the one additional data among the additional data stored in the data buffer part, thereby generating a data layer; an OSD canvas part generating an OSD layer using OSD data generated by the OSD generation unit; and a blending part blending at least one of the image layer and the data layer with the OSD layer and outputting the blended layer.

The control unit outputs at least one of the image layer, the data layer and the OSD layer as a frozen state and updates and outputs at least one layer.

The control unit continuously receives the broadcasting signal upon being input with the freezing command, stores the image signal included in the broadcasting signal to the image buffer part, and transmits the stored image signal to a predetermined external device.

The control unit, upon being input with the freezing command, continuously receives the broadcasting signal, stores the additional data included in the broadcasting signal to the data buffer part, and transmits the stored additional data to a predetermined external device.

According to another aspect of the present invention, there is provided a freezing method in a broadcasting receiver, comprising receiving predetermined operation signals; upon receiving a freezing command among the operational signals, continuously outputting at least one between one frame of same image signal and one frame of same additional data; scaling the one frame of same image signal and the one frame of same additional data; displaying on a screen the one frame of same image signal and the one frame of same additional data as scaled; generating OSD data corresponding to the predetermined external operation signals; and blending the OSD data with the one frame of same image signal and the one frame of same additional data and outputting them as blended data.

The freezing method may further comprise storing at least one of the image signal and the additional data included in the predetermined broadcasting signals; reading out the one frame of same image signal and the one frame of same additional data from the stored image signal and the additional data, thereby generating at least one of an image layer and a data layer; generating an OSD layer using the generated OSD data; and blending the OSD layer with at least one of the image layer and the data layer and outputting them as blended layers.

In the blending and outputting step, at least one of the image layer, the data layer and the OSD layer is output as a frozen state according to the freezing command, and at least one of the layers is updated and output.

The freezing method may further comprise upon input of the freezing command, continuously receiving the broadcasting signals and storing the image signal included in the broadcasting signals; and transmitting the stored image signal to a predetermined external device.

The freezing method may further comprise upon input of the freezing command, continuously receiving the broadcasting signals and storing the additional data included in the broadcasting signals; and transmitting the stored additional data to a predetermined external device.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
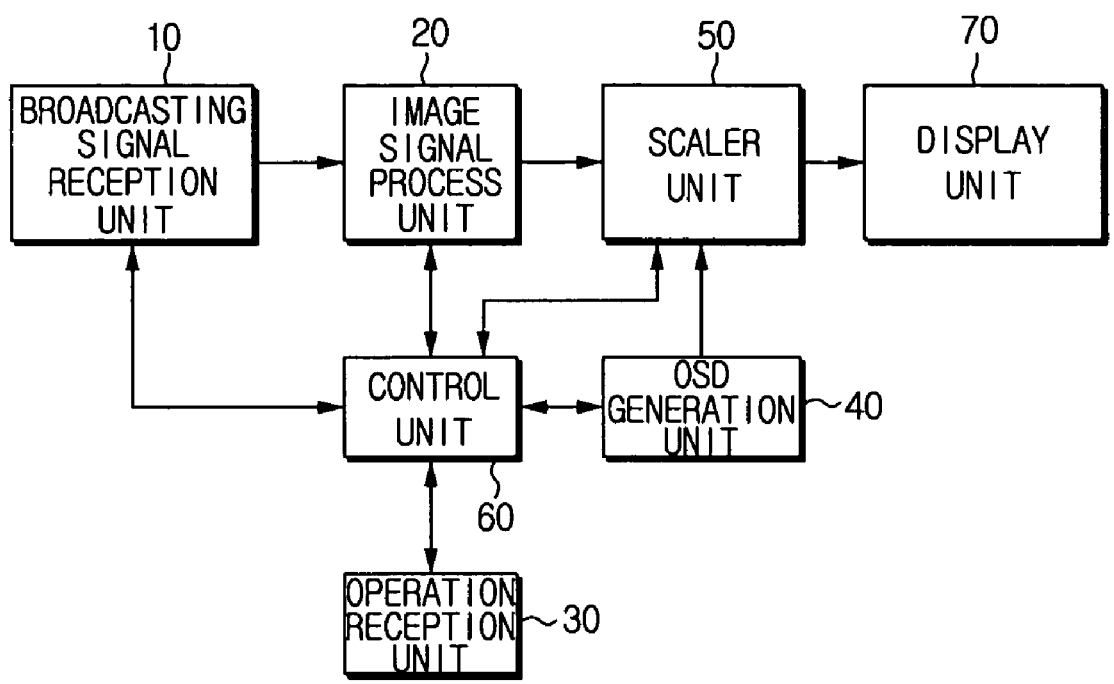
FIG. 1 is a block diagram illustrating the structure of a conventional broadcasting receiver.

Hereinafter, an exemplary embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well known functions or constructions are not described in detail since they would obscure the invention in unnecessary detail.

Figure 2:
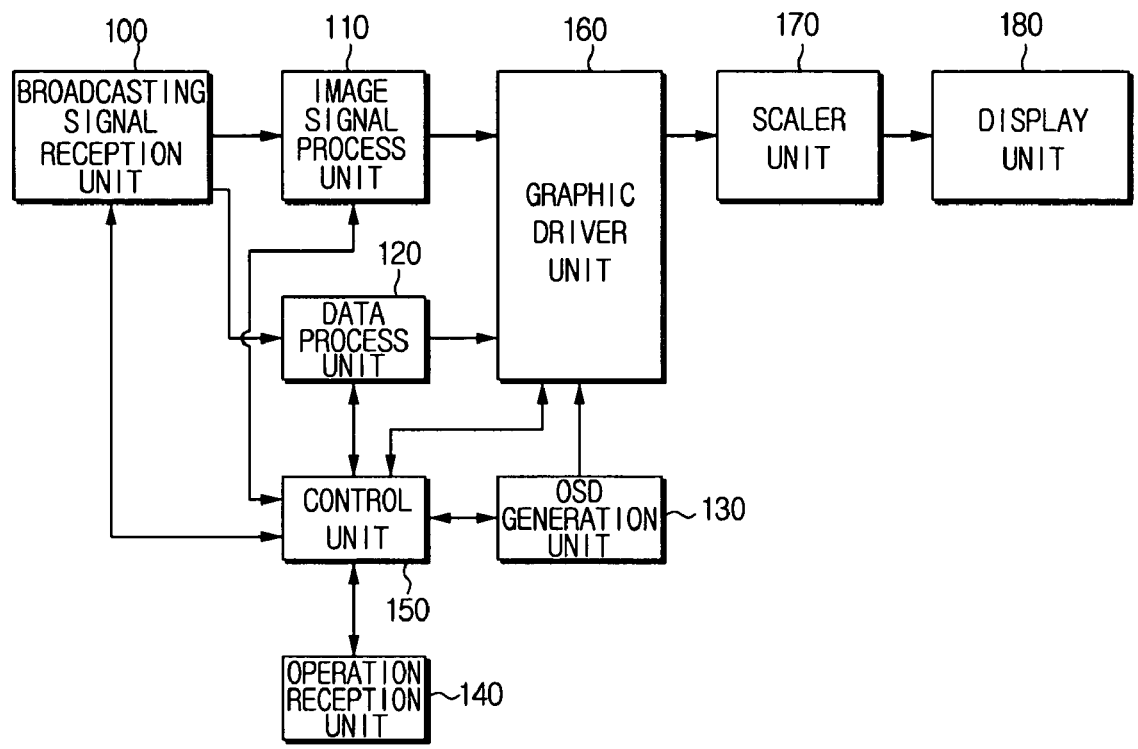
FIG. 2 is a block diagram schematically illustrating the structure of a broadcasting receiver according to an exemplary embodiment of the present invention.

FIG. 2 is a block diagram schematically illustrating the structure of a broadcasting receiver according to an exemplary embodiment of the present invention.

Referring to FIG. 2, the broadcasting receiver of this embodiment comprises a broadcasting signal reception unit 100, an image signal process unit 110, a data process unit 120, an on-screen-display (OSD) generation unit 130, an operation reception unit 140, a control unit 150, a graphic driver unit 160, a scaler unit 170, and a display unit 180.

The broadcasting reception unit 100 receives broadcasting signals transmitted from a predetermined broadcasting station, according to control of the control unit 150 which will be described hereinafter. The broadcasting signals are transmitted from the broadcasting station to the broadcasting receiver through terrestrial wave, wired connection, or a satellite. The broadcasting signals comprise an image signal for displaying an image, an audio signal for outputting sound, and additional data for supplying various additional information. The broadcasting signal reception unit 100 demodulates the broadcasting signal to a baseband signal and then separately outputs the image signal, the audio signal and the additional data.

The additional data comprises signals including Multimedia & Hypermedia information coding Expert Group (MHEG) data offering various additional information, Multimedia Home Platform (MHP) data, and subtitle data. The MHEG refers to a standardized code of multimedia and hypermedia information for offering application services through various types of media compatibly. The MHP refers to a standard for combining a digital broadcasting with the internet and the web.

The image signal process unit 110 receives the image signal from the broadcasting signal reception unit 100 and processes the received image signal. An audio signal process unit (not shown) receives the audio signal from the broadcasting signal reception unit 100 and processes the received audio signal. The processed audio signal is output through an audio output unit (not shown) such as a speaker. The data process unit 120 receives the additional data from the broadcasting signal reception unit 100 and processes the received additional data.

The OSD generation unit 130 produces OSD data constituting an OSD menu which is used to operate the broadcasting receiver. In other words, the OSD generation unit 130 produces OSD data corresponding to an external operation signal received through the operation reception unit 140 that will be described hereinafter.

The operation reception unit 140 is input with the external operation signal for controlling the operation of the broadcasting receiver and transmits the input external operation signal to the control unit 150. The external operation signal comprises a freezing command for converting a moving picture to a still image and a releasing command for canceling the frozen state of the image. The operation reception unit 140 receives the freezing command input by a user through a remote controller (not shown) and a key pad (not shown) and transmits the freezing command to the control unit 150. In the frozen state, when another external operation signal other than the releasing command is input, the operation reception unit 140 receives and transmits to the control unit 150 the other external operation signal.

The graphic driver unit 160 blends and outputs the image signal, the additional data and the OSD data, and performs a freeze function according to control of the control unit 150. More specifically, upon receiving the freezing command, the graphic driver unit 160 continuously outputs one frame of the same image signal, according to control by the control unit 150, so that the image being displayed on a screen looks like a still image.

When the additional data is transmitted from the broadcasting station and displayed on the screen together with the image signal, the graphic driver unit 160 outputs the image signal or the additional data selectively according to the freezing command. More specifically, as the user inputs the freezing command for converting the moving picture to the still image, the graphic driver unit 160 blends the additional data being updated in real time with the one frame of the same image signal and outputs the additional data and the image signal as blended data. Or, upon input of the freezing command by the user, the graphic driver unit 160 blends the image signal being updated in real time with the one frame of the same additional data and outputs them as blended data.

When the OSD data produced by the OSD generation unit 130 is input in the frozen state through the external operation signal, the graphic driver unit 160 blends and outputs the OSD data with the image signal and the additional data.

The scaler unit 170 receives and scales the image signal, the additional data and the OSD data being output from the graphic driver unit 160. The display unit 180 presents the scaled image signal, additional data and OSD data as the image, additional information and OSD menu on the screen.

The control unit 150 selects the broadcasting signal corresponding to a channel selected by the external operation signal and controls the broadcasting signal reception unit 100 to separate the broadcasting signal into the image signal, the audio signal and the additional data. Also, the control unit 150 controls the image signal process unit 110 and the data process unit 120 to process the image signal and the additional data, respectively, and produces the OSD data for constituting the OSD menu corresponding to the external operation signal input through the operation reception unit 140.

When the freezing command is input through the operation reception unit 140, the control unit 150 controls the graphic driver unit 160 to output the one frame of same image signal. When the additional data is included in the broadcasting signal, the control unit 150 controls the graphic driver unit 160 to output the one frame of same additional data together with the one frame of same image signal, update the OSD data according to the input external operation signal and output the additional data together with the one frame of image signal.

For example, when a movie and a subtitle for the movie are being displayed on the screen, if the user inputs the freezing command, one still image of the movie and the corresponding subtitle are displayed on the screen. If the user operates the remote controller (not shown) and the key pad (not shown) in order to check information on the movie, the OSD menu corresponding to the user's operation is displayed on the screen. Therefore, the user is able to search for the desired information through the OSD menu and check the information through the screen.

Figure 3:
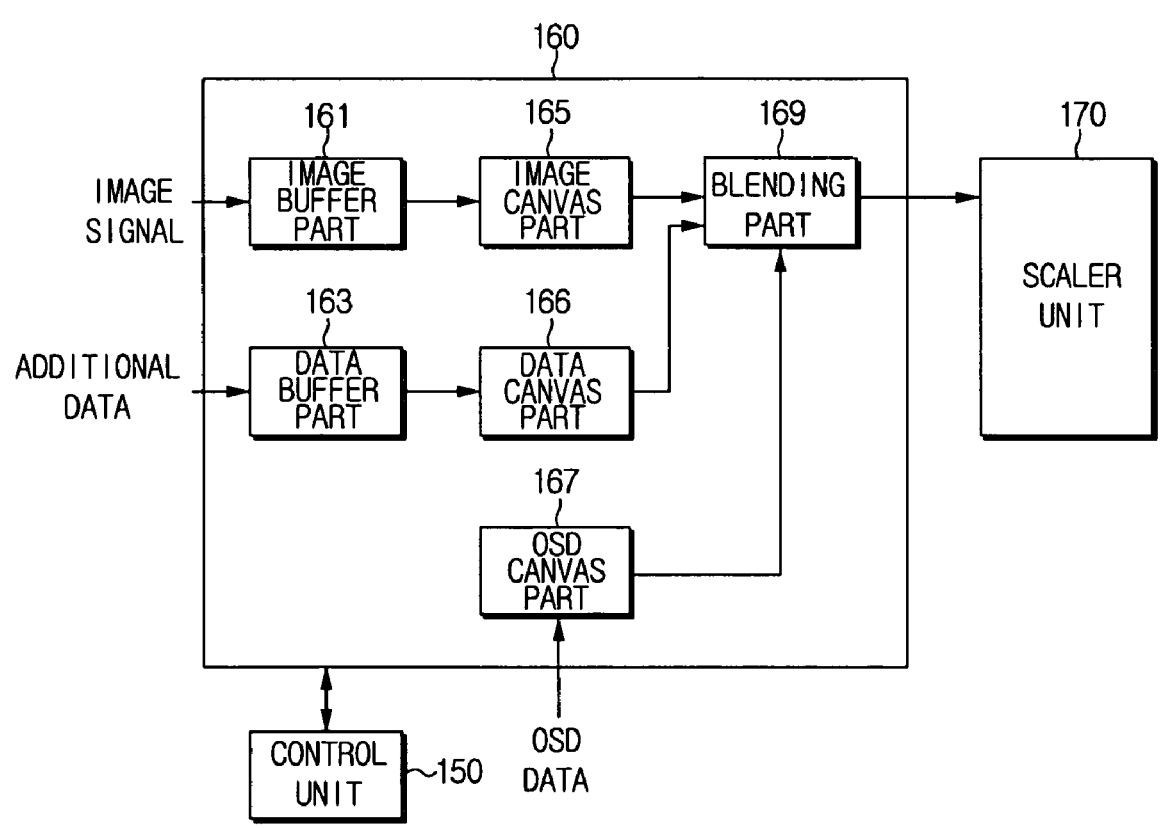
FIG. 3 is a view for explaining the operation of a graphic driver unit in the broadcasting receiver according to an exemplary embodiment of the present invention.

FIG. 3 is a view for explaining the operation of the graphic driver unit 160 of a broadcasting receiver according to an exemplary embodiment of the present invention.

The graphic driver unit 160 comprises an image buffer part 161, a data buffer part 163, an image canvas part 165, a data canvas part 166, an OSD canvas part 167, and a blending part 169.

The image buffer part 161 temporarily stores the image signal processed by the image signal process unit 110. The data buffer part 163 temporarily stores the additional data processed by the data process unit 120.

The image canvas part 165 reads out the image signal stored in the image buffer part 161 and thereby generates one frame of image layer. The data canvas part 166 reads out the additional data from the data buffer part 163 and thereby generates one frame of data layer. The OSD canvas part 167 generates one frame of OSD layer, using the OSD data produced by the OSD generation unit 130.

The blending part 165 blends the image layer, the data layer and the OSD layer and transmits them as a blended layer to the scaler unit 170.

When the freezing command is input through the operation reception unit 140, the control unit 150 controls the image canvas part 165 to output the image signal corresponding to the time of inputting the freezing signal and generates the same image layer continuously. Here, the control unit 150 controls the OSD canvas part 167 to update the OSD layer according to the OSD data produced by the external operation signal and controls the blending part 165 to blend the updated OSD layer with the image layer.

Furthermore, the control unit 150 controls the data canvas part 166 to generate the data layer by reading out the additional data corresponding to desired additional information from the data buffer part 163. Also, the control unit 150 controls the blending part 165 to blend the generated data layer with the image layer.

The control unit 150 controls the graphic driver unit 160 to continuously store in the image buffer part 161 the image signal included in the broadcasting signal received from the broadcasting station and continuously store in the data buffer part 163 the additional data. Thus, the stored image signal and the additional data are transmitted to a predetermined external device (not shown) according to a transmission command by a user, such that the user can control the image and the additional information through the external device.

Figure 4:
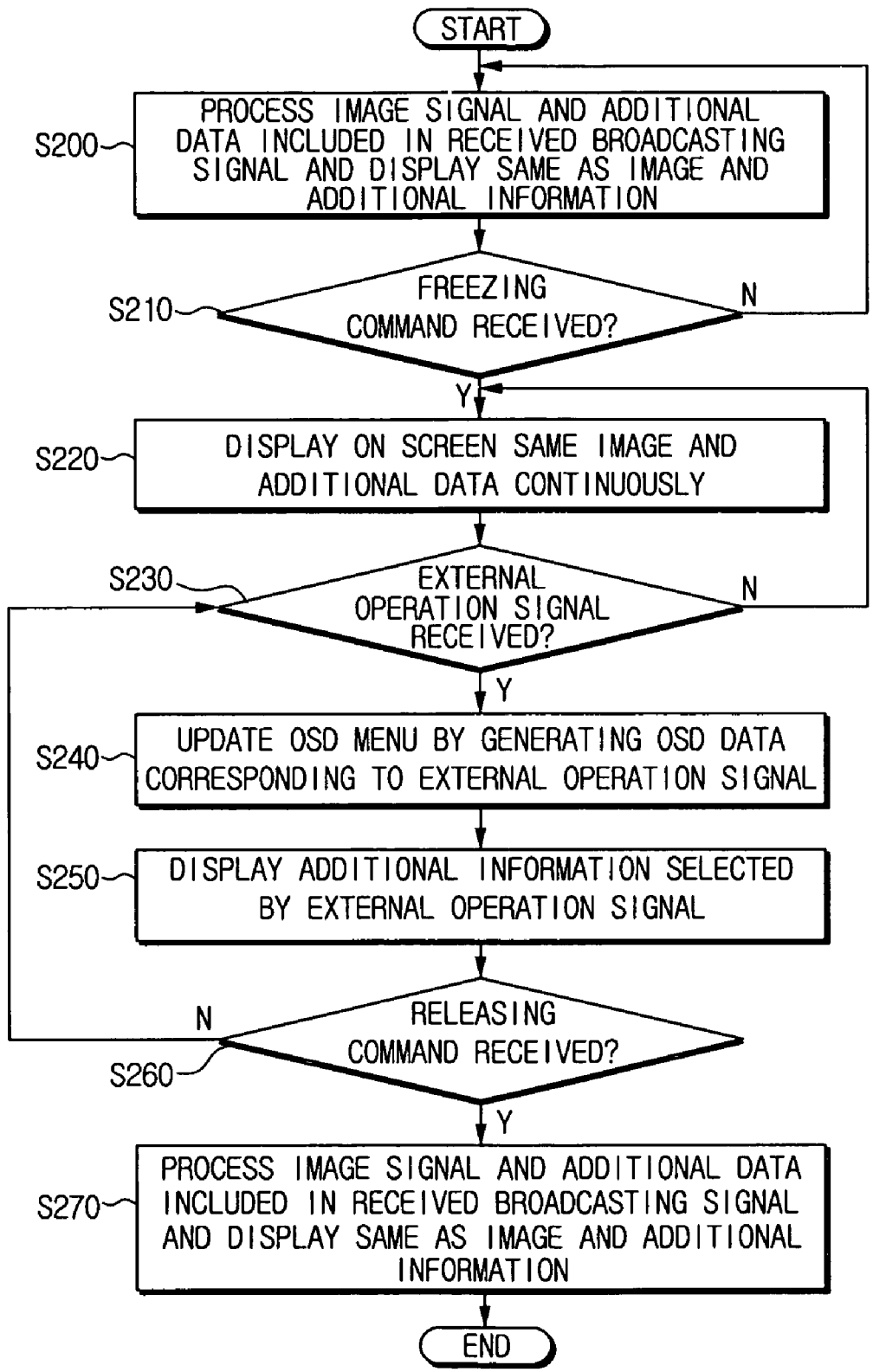
FIG. 4 is a flow chart for explaining a freeze function of the broadcasting receiver according to an exemplary embodiment of the present invention.

FIG. 4 is a flowchart for explaining the freeze function of the broadcasting receiver according to an exemplary embodiment of the present invention.

Referring to FIG. 4, first, the control unit 150 controls the respective units 100, 110, 120 and 160 to process the image signal and the additional data included in the broadcasting signal received through the broadcasting signal reception unit 100 and to display the processed signal and data on the screen as the image and the additional information (S200).

Upon receiving the freezing command through the operation reception unit 140 (S210), the control unit 150 controls the graphic driver unit 160 to display the same image and additional information continuously. That is, the graphic driver unit 160 continuously outputs the same image signal and additional data corresponding to the time of receiving the freezing command (S220). If there is no freezing command input, however, the step S200 is repeated.

When another external operation signal other than the releasing command is received (S230), the control unit 150 controls the OSD generation unit 130 and the graphic driver unit 160 to generate the OSD data corresponding to the external operation signal and update the OSD menu, respectively (S240). The control unit 150 also controls the graphic driver unit 160 to display the additional information selected by the external operation signal on the screen (S250). If there is no external operation signal input, however, the step S220 is repeated.

When the releasing command is received through the operation reception unit 140 (S260), the control unit 150 controls the respective units 100, 110, 120 and 160 to process the image signal and the additional data included in the broadcasting signal transmitted from the broadcasting station and display the processed signal and data on the screen as the image and the additional information (S270). However, if the releasing command is not received, the steps S230 to S250 are repeated.

According to the above processes, the additional information can be changed by displaying the OSD menu, as updated by the external operation signal, on the screen even in the frozen state.

As can be appreciated from the above description, according to an exemplary embodiment of the present invention, the operation of the broadcasting receiver can be controlled by displaying the OSD menu updated by the external operation signal received during the frozen state. Therefore, the user can change the additional information being displayed on the screen and utilize the various additional information offered by the broadcasting station even during the frozen state.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A broadcasting receiver comprising:
a broadcasting reception unit which receives broadcasting signals comprising an image signal, an audio signal and additional data;
an operation reception unit which receives operation signals;
a graphic driver unit which selectively outputs at least one of a frozen image frame and a frozen additional data frame from the received image signal and additional data, according to a freezing command input through the operation reception unit;
a display unit which displays on a screen the at least one of the frozen image frame and the frozen additional data frame;
an on-screen-display (OSD) generation unit which produces OSD data if an operation signal corresponding to the OSD data is input through the operation reception unit, while the graphic driver unit selectively outputs the at least one of the frozen image frame and the frozen additional data frame; and
a control unit which controls the graphic driver unit to blend the OSD data with the selectively output at least one of the frozen image frame and the frozen additional data frame to generate blended data, output the blended data for display on the display unit, update the OSD data, and display on the screen the additional data which are updated according to another operation signal input through the operation reception unit while the display unit displays on the screen the at least one of the frozen image frame and the frozen additional data frame.

2. The broadcasting receiver of claim 1, the graphic driver unit comprises:
an image buffer which stores the image signal included in the broadcasting signals;
an image canvas part which reads out one frame of the image signal from the image buffer part, thereby generating an image layer;
a data buffer part which stores the additional data included in the broadcasting signals;
a data canvas part, according to an external operation signal for selecting one of the additional data, which reads out the one of the additional data stored in the data buffer part, thereby generating an additional data layer;
an OSD canvas part which generates an OSD layer using the OSD data generated by the OSD generation unit; and
a blending part which blends at least one of the image layer and the additional data layer with the OSD layer and outputting the blended layer which is the blended data.

3. The broadcasting receiver of claim 2, wherein the control unit outputs at least one of the image layer, the additional data layer and the OSD layer as a frozen state according to the freezing command, and updates and outputs the at least one layer.

4. The broadcasting receiver of claim 2, wherein the control unit continuously receives the broadcasting signals upon being input with the freezing command, stores the image signal included in the broadcasting signals to the image buffer part, and transmits the stored image signal to an external device.

5. The broadcasting receiver of claim 2, wherein the control unit, upon being input with the freezing command, continuously receives the broadcasting signals, stores the additional data included in the broadcasting signals to the data buffer part, and transmits the stored additional data to an external device.

6. A freezing method, for a broadcasting receiver, comprising:
receiving broadcasting signals comprising an image signal and additional data;
receiving operation signals;
upon receiving a freezing command among the operational signals, selectively outputting at least one of a frozen image frame and a frozen additional data frame from the received image signal and additional data;
displaying on a screen the at least one of the frozen image frame and the frozen additional data frame;
generating OSD data if an operation signal corresponding to the OSD data is input, while the at least one of the frozen image frame and the frozen additional data is selectively output; and
blending the OSD data with the selectively output at least one of the frozen image frame and the frozen additional data frame to generate blended data, outputting the blended data for display, updating the OSD data, and displaying on the screen the additional data which are updated according to another operation signal input by a user while the at least one of the frozen image frame and the frozen additional data frame is selectively output.

7. The freezing method of claim 6, further comprising:
storing the image signal and the additional data included in the broadcasting signals;
reading out the at least one of the frozen image frame and the frozen additional data frame from the stored image signal and additional data, thereby generating at least one of an image layer and an additional data layer;

generating an OSD layer using the generated OSD data; and blending the OSD layer with the at least one of the image layer and the additional data layer to output a blended layer which is the blended data.

8. The freezing method of claim 7, wherein, by the blending operation, at least one of the image layer, the additional data layer and the OSD layer is output as a frozen state according to the freezing command, and at least one of the layers is updated and output.

9. The freezing method of claim 6, further comprising:

upon input of the freezing command, continuously receiving the broadcasting signals and storing the image signal included in the broadcasting signals; and transmitting the stored image signal to an external device.

10. The freezing method of claim 6, further comprising:

upon input of the freezing command, continuously receiving the broadcasting signals and storing the additional data included in the broadcasting signals; and transmitting the stored additional data to an external device.

11. The broadcasting receiver of claim 1, wherein the additional data comprises at least one of Multimedia and Hypermedia information coding Expert Group (MHEG) data including various additional information and Multimedia Home Platform (MHP) data.

12. The freezing method of claim 6, wherein the additional data comprises at least one of Multimedia and Hypermedia information coding Expert Group (MHEG) data including various additional information and Multimedia Home Platform (MHP) data.

* * * * *